(12) United States Patent
Pecoraro et al.

(10) Patent No.: US 12,537,694 B1
(45) Date of Patent: Jan. 27, 2026

(54) SYSTEM AND METHOD FOR VALIDATING AN INSTRUCTION WITH MULTIPLE DIGITAL SIGNATURES

(71) Applicant: The Bank of New York Mellon, New York, NY (US)

(72) Inventors: James Pecoraro, New York, NY (US); Scott Ryan James, New York, NY (US); Jakub Guzikowski, Wroclaw (PL); Cezary Siewierski, Dublin (IE)

(73) Assignee: THE BANK OF NEW YORK MELLON, New York, NY (US)

( * ) Notice: Subject to any disclaimer, the term of this patent is extended or adjusted under 35 U.S.C. 154(b) by 62 days.

(21) Appl. No.: 18/482,664

(22) Filed: Oct. 6, 2023

(51) Int. Cl.
*H04L 29/06* (2006.01)
*H04L 9/32* (2006.01)

(52) U.S. Cl.
CPC .................................. *H04L 9/3247* (2013.01)

(58) Field of Classification Search
CPC ...................................................... H04L 9/3247
See application file for complete search history.

(56) References Cited

U.S. PATENT DOCUMENTS

| | | |
|---|---|---|
| 9,672,499 B2 | 6/2017 | Yang et al. |
| 10,715,331 B2 | 7/2020 | Davis |
| 10,721,336 B2 | 7/2020 | Banerjee et al. |
| 10,755,237 B2 | 8/2020 | Song et al. |
| 10,855,667 B2 | 12/2020 | Breu |
| 10,901,983 B2 | 1/2021 | Zhang et al. |
| 10,984,413 B2 | 4/2021 | Armstrong et al. |
| 11,062,366 B2 | 7/2021 | Metnick et al. |
| 11,095,450 B2 | 8/2021 | Purves |
| 11,100,501 B1 | 8/2021 | Rainey et al. |
| 11,127,002 B2 | 9/2021 | Ma et al. |
| 11,153,069 B2 | 10/2021 | Kurian |
| 11,188,900 B2 | 11/2021 | Arora |
| 11,188,977 B2 | 11/2021 | Youb et al. |
| 11,308,484 B2 | 4/2022 | Smirnov |
| 11,348,104 B2 | 5/2022 | Cheng et al. |
| 11,374,754 B2 * | 6/2022 | Wang ..................... H04L 9/006 |
| 11,394,559 B2 | 7/2022 | Nosseir et al. |
| 11,397,962 B2 | 7/2022 | Chan et al. |
| 11,488,176 B2 | 11/2022 | Padmanabhan et al. |

(Continued)

FOREIGN PATENT DOCUMENTS

| | | |
|---|---|---|
| KR | 10-2273315 B1 | 7/2021 |
| KR | 10-2522381 B1 | 4/2023 |

(Continued)

*Primary Examiner* — Dao Q Ho
(74) *Attorney, Agent, or Firm* — Pillsbury Winthrop Shaw Pittman, LLP (57) ABSTRACT

Systems and methods for validating an instruction with multiple digital signatures may receive an instruction to initiate a transaction; generate first and second digital certificates; validate a set of one or more policy limits; sign the instruction using the first digital certificate, based on the validating; instantiate an instruction workflow associated with the transaction; sign the instruction workflow using the second digital certificate, based on completion of the instruction workflow; build a transaction request, in which the transaction request includes at least the instruction, the first signature, and the second signature; verify the first and second signatures; and sign the transaction request.

20 Claims, 3 Drawing Sheets

(56) References Cited

U.S. PATENT DOCUMENTS

| | | | |
|---|---|---|---|
| 11,501,370 B1* | 11/2022 | Paya | H04L 9/0819 |
| 11,563,571 B1 | 1/2023 | Teja | |
| 11,587,070 B2 | 2/2023 | Maim | |
| 11,587,071 B2 | 2/2023 | Ravinathan et al. | |
| 11,606,219 B2 | 3/2023 | Wright et al. | |
| 11,935,042 B2* | 3/2024 | Sforzin | G06Q 20/401 |
| 2003/0177392 A1* | 9/2003 | Hiltgen | H04L 9/3271 |
| | | | 713/172 |
| 2004/0236688 A1 | 11/2004 | Bozeman | |
| 2013/0007460 A1* | 1/2013 | Dare | G06Q 20/3829 |
| | | | 713/175 |
| 2014/0019766 A1* | 1/2014 | Takahashi | H04L 9/3231 |
| | | | 713/176 |
| 2016/0253663 A1 | 9/2016 | Clark et al. | |
| 2017/0180133 A1* | 6/2017 | Kumar | H04L 9/3297 |
| 2018/0048461 A1* | 2/2018 | Jutla | H04L 9/3268 |
| 2019/0034919 A1* | 1/2019 | Nolan | G06Q 20/36 |
| 2020/0127851 A1* | 4/2020 | Finlow-Bates | H04L 63/0823 |
| 2020/0186355 A1* | 6/2020 | Davies | H04L 63/029 |
| 2020/0202346 A1* | 6/2020 | Perullo | H04L 9/3255 |
| 2020/0250174 A1 | 8/2020 | Padmanabhan et al. | |
| 2020/0410508 A1* | 12/2020 | Schiffman | G06Q 10/103 |
| 2021/0152365 A1* | 5/2021 | Nosseir | H04L 9/321 |
| 2021/0344766 A1 | 11/2021 | Monahov et al. | |
| 2021/0359863 A1* | 11/2021 | Hung | H04L 9/50 |
| 2021/0383363 A1* | 12/2021 | Smirnov | G06Q 20/3674 |
| 2021/0383377 A1* | 12/2021 | Zhou | H04L 9/3213 |
| 2022/0036354 A1 | 2/2022 | Zhang et al. | |
| 2022/0044316 A1* | 2/2022 | Gaur | G06Q 20/3825 |
| 2022/0067717 A1 | 3/2022 | Yun | |
| 2022/0114584 A1 | 4/2022 | Conley et al. | |
| 2022/0263664 A1 | 8/2022 | Wahab et al. | |
| 2022/0284428 A1 | 9/2022 | Zhou et al. | |
| 2022/0351232 A1 | 11/2022 | Chan et al. | |
| 2023/0033192 A1 | 2/2023 | Sutherland et al. | |
| 2023/0037932 A1* | 2/2023 | Wen | H04L 9/3247 |
| 2023/0206329 A1* | 6/2023 | Cella | G06Q 20/0855 |
| 2024/0154813 A1* | 5/2024 | Lu | G06F 21/64 |

FOREIGN PATENT DOCUMENTS

| | | |
|---|---|---|
| WO | 2017/098519 A1 | 6/2017 |
| WO | 2019/020824 A1 | 1/2019 |
| WO | 2019/139204 A1 | 7/2019 |
| WO | 2020/161688 A1 | 8/2020 |
| WO | 2021/041746 A1 | 3/2021 |
| WO | 2022/208330 A1 | 10/2022 |
| WO | 2023/068609 A1 | 4/2023 |

* cited by examiner

SYSTEM AND METHOD FOR VALIDATING AN INSTRUCTION WITH MULTIPLE DIGITAL SIGNATURES

CROSS-REFERENCE TO RELATED APPLICATIONS

No cross-reference is presented at this time.

BACKGROUND

Signing transactions for publication to a blockchain is a crucial step in ensuring the security and integrity of the blockchain network. This process typically involves cryptographic techniques to prove the authenticity and ownership of a transaction before it is added to the blockchain. Services that sign transactions for publication to a blockchain are generally highly complex and developed in a highly secured manner. This leads to code that is hard to change or adapt, making such systems inflexible.

Often, signing of transactions to the blockchain is tied to various policies, and policy enforcement provides additional complexity to the transaction signing process. For example, different institutions may have varying policy considerations, or a given institution may desire to change policies regularly or over time. Processing of transactions may be hindered or delayed due to the inherent rigidity of currently available systems for signing transactions.

Presently available systems typically provide a signing service which will call to another service for a policy check. But this approach may present certain security concerns. A signing service must run with the highest level of security due to access to private keys, and may be vulnerable when relying on any external resources. Other available systems provide a signing service which implements a rudimentary policy engine. But this may limit the policy rules and makes changes to the rules subject to the release procedures of the signing service itself.

Accordingly, what is needed are systems and methods which enable separation of the policy enforcement from the transaction signing, while maintaining the same level of security, in order to allow more agile changes to the policy enforcement.

SUMMARY

Aspects of the disclosure relate to methods, apparatuses, and/or systems for validating an instruction with multiple digital signatures.

In some aspects, the techniques described herein relate to a method for validating an instruction with multiple digital signatures, implemented by one or more processors, the method including: receiving an instruction to initiate a transaction; generating first and second digital certificates; validating a set of one or more policy limits; signing the instruction using the first digital certificate, based on the validating; instantiating an instruction workflow associated with the transaction; signing the instruction workflow using the second digital certificate, based on completion of the instruction workflow; building a transaction request, wherein the transaction request includes at least the instruction, the first digital signature, and the second digital signature; verifying the first and second digital signatures; and signing the transaction request.

In some aspects, the techniques described herein relate to a method, wherein the set of one or more policy limits is used to authorize the transaction.

In some aspects, the techniques described herein relate to a method, wherein the instruction workflow includes a plurality of upstream systems, each of which is configured to perform respective policy checks.

In some aspects, the techniques described herein relate to a method, wherein policy checks include one or more of sanction screening, source of funds checks, or travel rules.

In some aspects, the techniques described herein relate to a method, wherein the upstream systems are executed in a specific order and wherein failure of one policy check terminates the instruction flow.

In some aspects, the techniques described herein relate to a method, wherein the instruction workflow implements one or more external services to verify criteria associated with the transaction request.

In some aspects, the techniques described herein relate to a method, further including writing the signed transaction request to a blockchain ledger.

In some aspects, the techniques described herein relate to a method, wherein verifying the first and second signatures includes executing a signing service that is configured to enforce the validity of the first and second signatures.

In some aspects, the techniques described herein relate to a method, wherein the signing service includes an application protocol interface (API) call to an external validation engine.

In some aspects, the techniques described herein relate to a system for validating an instruction with multiple digital signatures, implemented by one or more processors, the system including: one or more code sets stored in memory and executed by the one or more processors, which, when executed, configure the one or more processors to: receive an instruction to initiate a transaction; generate first and second digital certificates; validate a set of one or more policy limits; sign the instruction using the first digital certificate, based on the validating; instantiate an instruction workflow associated with the transaction; sign the instruction workflow using the second digital certificate, based on completion of the instruction workflow; build a transaction request, wherein the transaction request includes at least the instruction, the first signature, and the second signature; verify the first and second signatures; and sign the transaction request.

In some aspects, the techniques described herein relate to a system, wherein the set of one or more policy limits is used to authorize the transaction.

In some aspects, the techniques described herein relate to a system, wherein the instruction workflow includes a plurality of upstream systems, each of which is configured to perform respective policy checks.

In some aspects, the techniques described herein relate to a system, wherein policy checks include one or more of sanction screening, source of funds checks, or travel rules.

In some aspects, the techniques described herein relate to a system, wherein the upstream systems are executed in a specific order and wherein failure of one policy check terminates the instruction flow.

In some aspects, the techniques described herein relate to a system, wherein the instruction workflow implements one or more external services to verify criteria associated with the transaction request.

In some aspects, the techniques described herein relate to a system, further configured to write the signed transaction request to a blockchain ledger.

In some aspects, the techniques described herein relate to a system, wherein verifying the first and second signatures includes executing a signing service that is configured to enforce the validity of the first and second signatures.

In some aspects, the techniques described herein relate to a system, wherein the signing service includes an application protocol interface (API) call to an external validation engine.

In some aspects, the techniques described herein relate to a method for validating an instruction with multiple digital signatures, implemented by one or more processors, the method including: receiving an instruction to initiate a transaction; validating a set of one or more policy limits; signing the instruction using a first digital certificate, based on the validating; instantiating an instruction workflow associated with the transaction; signing the instruction workflow using a second digital certificate, based on completion of the instruction workflow; building a transaction request, wherein the transaction request includes at least the instruction, the first signature, and the second signature; verifying the first and second signatures; and signing the transaction request.

In some aspects, the techniques described herein relate to a system, wherein the set of one or more policy limits is used to authorize the transaction; and wherein the instruction workflow includes a plurality of upstream systems, each of which is configured to perform respective policy checks.

Various other aspects, features, and advantages will be apparent through the detailed description and the drawings attached hereto. It is also to be understood that both the foregoing general description and the following detailed description are exemplary and not restrictive of the scope of the disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

In the following description, for the purposes of explanation, numerous specific details are set forth in order to provide a thorough understanding of the various embodiments. It will be appreciated, however, by those having skill in the art, that the embodiments may be practiced without these specific details, or with an equivalent arrangement. In other cases, well-known structures and devices are shown in block diagram form in order to avoid unnecessarily obscuring the embodiments.

To mitigate the problems described herein, the inventors had to both invent solutions and, in some cases just as importantly, recognize problems overlooked (or not yet foreseen) by others in the field of instruction validation. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Embodiments provide or implement a signing service that confirms the validity of at least two digital signatures ahead of signing a blockchain transaction. In various embodiments, these signatures may be created and included in the transaction request by upstream systems that perform policy checks prior to effectuating the transaction.

In some embodiments, two (or more) certificates, containing the encryption keys necessary to generate the signatures, are created and distributed to the upstream systems to use in the construction of the signatures. The public key versions of these certificates may be made available to the signing service to validate the signatures.

In some embodiments, the first signature may be applied immediately when a user requests a transaction, e.g., at client instruction entry in a commercial transaction system. This confirms that the details of the transaction are not altered from the user's intentions as it travels through various custody systems, e.g., of an institution or company implementing the transaction. In some embodiments, the second signature may be applied by a signing application, e.g., of a digital assets instruction processing platform, once all rules of an elaborate workflow have been completed. These signatures offer a cryptographically secure way of communicating to the signing service that these processes have been completed and the transaction has not been altered since the policy checks were performed.

Various embodiments are provided for enforcing the validity of the signatures by the signing service. A first embodiment may, e.g., leverage commercially available software which confirms the first two signatures are in place just before signing a transaction. The signing service is sent the signatures for validation and will only proceed if the signatures are valid. In a second embodiment, a signing service may be integrated directly into the system and is configured to check the signatures without need to make a call to an external service. These and other embodiments allow implementing very sophisticated policy decisions to ensure the highest level of security on digital transactions, while also enabling updating of these policies and deploying changes very quickly and efficiently without compromising the security of the private keys. These and other features are described in detail herein.

Those with skill in the art will appreciate that inventive concepts described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions. These and other features are described in detail herein with reference to the foregoing figures.

Figure 1:
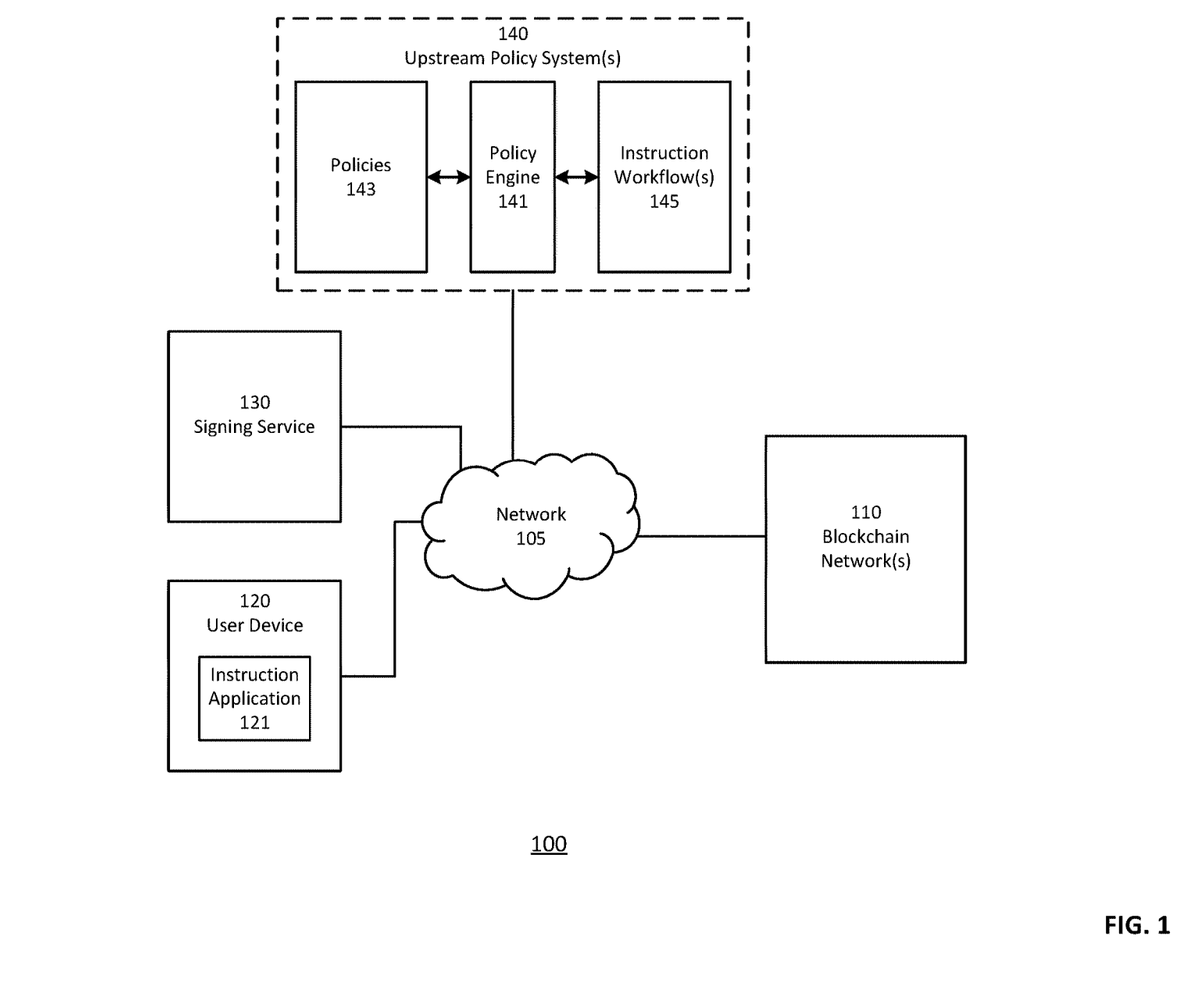
FIG. 1 depicts an illustrative system for validating an instruction with multiple digital signatures, in accordance with at least one embodiment.

FIG. 1 depicts an illustrative system for validating an instruction with multiple digital signatures, in accordance with at least one embodiment. FIG. 1 illustrates a functional block diagram of an embodiment of an instruction validating system 100 within which at least some of the disclosed techniques may be implemented. The instruction validating system 100 may be established to permit the writing or recording of transactions to a blockchain network 110 via network 105. In some embodiments, instruction validating system 100 may constitute at least part of a custody platform or digital assets platform that implements the digital assets instruction processing (or transaction processing) of a request for a change to the blockchain.

In some embodiments, blockchain network 110, may be a public blockchain such as, e.g., Bitcoin® or Ethereum®, which is open and decentralized, accessible to a global user base. In some embodiments, blockchain network 110 may be a private blockchain which is a restricted and centralized network used for specific organizational or consortium-based applications, with an emphasis on privacy and control. Elements of instruction validating system 100 may communicate with one or more of the other elements and/or with blockchain network 110 or other entities via the network 105.

In some embodiments, each of the elements of instruction validating system 100 may be or may include applications executed on respective computing systems, though this need not always be the case. In some examples, one or more of the applications may be executed on a single computing system (which is not to suggest that such a computing system may not comprise multiple computing devices or nodes, or that each computing device or node need be co-located, indeed, a computing system comprising multiple servers that house multiple computing devices may be operated by a single entity and the multiple servers may be distributed, e.g., geographically). For example, in some embodiments, an entity may execute both a signing service application 130 and various upstream policy system applications 140 on a computing system of the entity. Moreover, in some examples, the entity may also provide customers access to an instruction application 121 on user device 120, which may be a web-based application hosted by a computing system managed by or provisioned by the entity, or which communicates with such a computing system via an application programming interface (API). Accordingly, one or more of the depicted entities may communicate with one another via messages transmitted over network 105, such as the Internet and/or various other local area networks. For example, one or more applications may communicate via messages transmitted over network 105.

In some example embodiments, instruction application 121 may be a client/customer/end user facing application or individual user application with which a user interfaces to manage their account, e.g., assets, and/or specify or send instructions, e.g., to execute a transaction. While only one instance of an instruction application 121 is shown, embodiments of the instruction validating system 100 may include tens, hundreds, thousands, or more such applications accessed by different users on or from their respective computing systems (e.g., user device 120). In some examples, such an application may also, or alternatively, be used internally, such as by an account or fund manager that specifies instructions or transactions, e.g., for a user or within a fund. The instruction application 121 and users of the system (e.g., end users and/or internal managers, etc.) may be isolated from accessing some or all of the features and/or information associated with the signing service 130 and/or upstream policy systems 140, except as described herein.

In some embodiments, instruction application 121 may include a user interface through which a user may interact with instruction validating system 100 via user device 120. For example, a user may desire to execute a digital asset transaction. According to embodiments, the user may interact with a user interface of instruction application 121, accessing only the data which a user/user account of the user device 120 is permitted to view, which in turn may send a request or instruction, via an application programming interface (API) associated with a signing service 130, to facilitate a transaction between one user and another user on blockchain network 110. For example, a user of a user device 120 may access their account information or information about transactions and their assets specified by the user on the instruction application 121, and information about success/failure of processing a transaction by the signing service 130, but not information about how the signing service 130 processed that transaction. In other embodiments, select information may be shared with the user who initiated the request for the transaction, e.g., failure of a specific policy check, etc., as described herein.

In some example embodiments, an instruction application 121 may access information about securities, such as security prices, from the blockchain network 110 (or from a 3rd party), to determine whether to effectuate one or more trades of a security on blockchain network 110, which in some examples may comprise transmitting properties for a transaction to be effectuated on the market. In other example use cases, the instruction application 121 may access information about shipping rates, quantities of assets (e.g., goods) available (e.g., in inventory), costs of assets (e.g., market), among other information by which an instruction regarding a transaction for goods or services may be specified. The instruction application 121 may store accounting application records indicative of properties of transactions specified by users of the instruction application 121 to be effectuated. An example of such transactions and their associated properties may be for trades (e.g., buying, selling, etc.) of securities on a blockchain network 110 based on security prices.

In some example embodiments, instruction application 121 is an internally facing application by which agents or employees of an entity manage assets of the entity. While only one instance of an instruction application 121 is shown, embodiments of the environment 100 may permit multiple agents or employees of an entity implementing instruction application 121 to access respective instances of such an application from their respective computing systems (e.g., respective user devices 120). In some examples, instruction application 121 may provide information about assets held by the entity, and transactions corresponding to those assets. Some or all of those transactions may be effectuated by the entity based on properties of transactions specified by users of instruction application 121.

In some embodiments, instruction validating system 100 may include signing service 130. In some embodiments, signing service 130 may provide a general process that has access to key material used to sign transactions that are to be broadcast to a blockchain, e.g., blockchain network 110. In some embodiments, signing service 130 may be responsible for cryptographic signature generation during transaction processing. In some embodiments, signing service 130 may be configured to create and store various keys to be used in transactions, and signs transactions once confirmed to be "authentic" (e.g., passed through a set of policy rules, as described herein).

For example, in some embodiments, when a user initiates an instruction to execute a transaction, the instruction may be submitted to signing service 130, which may hold or generate the necessary private keys, when appropriate. As explained herein, in some embodiments, signing service 130 will not sign the instruction unless and until it receives confirmation that the transaction details have been validated, the user's identity has been verified, and compliance with various policies and rules has been ensured (e.g., by various upstream policy systems 140, including policy engine 141, described in detail herein). Once these checks are completed and the transaction is deemed legitimate, the signing service digitally signs the transaction using its private keys. This cryptographic signature serves as proof of authorization and is essential for validating the transaction's authenticity when it is broadcast to the network. Accordingly, in some embodiments, signing service 130 may play an important role in securing and authenticating transactions, ensuring that only authorized and valid transactions are included in the blockchain.

As noted herein, this is a paradigm shift from prior systems in which a signing service is configured to validate the transaction details, verify the user's identity, and ensure compliance with various policies and rules as part of its own signing process. By separating the policy enforcement from the transaction signing, while maintaining the same level of security, embodiments significantly improve overall performance by allowing more agile changes to the policy enforcement without encumbering signing service performance.

In some embodiments, instruction validating system 100 may include one or more upstream policy systems 140. As understood herein, upstream policy systems 140 may be a collection of one or more systems which execute or otherwise provide functions required prior to the signing (e.g., by signing service 130) of an instruction to implement a transaction request. For example, upstream policy systems 140 may include at least policy engine 141, policies 143, and/or workflow(s) 145.

In some embodiments, policy engine 141 may be a software component or application that enforces rules and conditions governing various aspects of blockchain-related transactions and usage. These rules can encompass factors such as transaction validation, compliance with regulatory requirements, user access control, and smart contract execution, etc. In some embodiments, policy engine 141 may play an important role in maintaining the integrity and security of blockchain networks by automating decision-making processes based on established policies, helping to prevent fraud, ensure adherence to legal guidelines, and facilitate efficient and reliable blockchain operations. In some embodiments, policy engine 141 may be configured to validate the transaction details, verify the user's identity, and ensure compliance with various policies and rules. Once these checks are completed and the transaction is deemed legitimate, signing service 130 may be configured to digitally sign the transaction using its private keys.

In some embodiments, policies 143 may include or be representative of one or a plurality of policies and/or rules, e.g., stored in one or more databases or otherwise accessible (e.g., via other upstream systems or applications), and provided in order to attempt to validate the instruction. For example, policies 143 may include one or more sets of internal and/or external policies, each of which sets a respective policy limit that must be validated (e.g., by policy engine 141) prior to signing (e.g., by signing service 130). In some embodiments, policy limits may relate to any number of a variety of aspects of the requested transaction. For example, in some embodiments, policies and their associated limits may relate to users associated with a given transaction or may relate to underlying requirements associated with the transaction, etc. In some embodiments, a set of policies may require validation before approving a transaction for signing.

A non-exhaustive list of example policies includes:

Transaction Limits: Policy engine 141 may enforce limits on the transaction amount, ensuring that transactions fall within predefined thresholds to prevent excessive transfers or potential fraud.

Whitelisted Addresses: Certain addresses may be whitelisted to expedite transactions or allow for specific operations, and policy engine 141 may verify that the sender and recipient addresses comply with this list.

Regulatory Compliance: To adhere to legal and regulatory requirements, policy engine 141 may perform checks to confirm that transactions comply with certain regulations, particularly for larger transactions.

Gas Fees: Policies may dictate the acceptable gas fees for transactions, ensuring that users pay an appropriate fee to prioritize transaction processing within the network.

Smart Contract Interaction: If the transaction involves interactions with smart contracts, policy engine 141 may be configured to verify that these interactions conform to predetermined contract rules and conditions.

Double Spending Prevention: To prevent double-spending, policy engine 141 may check the transaction history to ensure that the sender has sufficient funds and hasn't already spent them elsewhere.

Time Constraints: Time-based policies may be applied to transactions, requiring them to be completed within a certain timeframe or imposing restrictions on specific time windows for certain operations.

Multi-Signature Requirements: In the case of multi-signature wallets, policy engine 141 may enforce the necessary number of signatures from authorized parties before approving the transaction.

Account Permissions: Depending on the user's role or account type, policy engine 141 may enforce permissions for specific actions, allowing only authorized users to perform certain operations.

Escrow and Dispute Resolution: For more complex transactions, policies may define rules for escrow, dispute resolution, or arbitration mechanisms to address potential conflicts.

These policies, among others, serve to maintain the integrity, security, and compliance of transactions within blockchain network 110, ensuring that only valid and authorized transactions are signed and added to the blockchain.

As explained herein, in some embodiments, signing service 130 may be configured to create and store the keys to be used in transactions, and sign transactions once confirmed to be "authentic" (e.g., passed through a set of policy rules). In some embodiments, signing service 130 may be in active communication with policy engine 141. In some embodiments, policy engine 141 may be configured to generate, compile or otherwise aggregate one or more sets of policy rules that may be applied in determining if an instruction (e.g., a transaction request) should be allowed to be processed. For example, in various embodiments, different sets of policy rules may require validation, e.g., depending on the requestor, type of transaction, etc. Furthermore, some policy rules may be internal (e.g., originating within or being associated with instruction validating system 100), while some policy rules may be external (e.g., originating outside of or being otherwise unrelated to instruction validating system 100).

In some embodiments, upstream policy systems 140 may include instruction workflow(s) 145. As understood herein, instruction workflow(s) 145 may be or may include an ordered set of checks, steps, or tasks which must be completed before signing service 130 will sign an instruction. For example, instruction workflow(s) 145 may include checks for sanctions limitations, quantity limits, balance checks, etc. Such checks make up a given workflow required to gain approval to issue a blockchain transaction. It should be noted that some workflows of instruction workflow(s) 145 may include validation of one or more policies, e.g., of policies 143, by policy engine 141.

In some embodiments, instruction workflow(s) 145 may be required to be completed in an order, e.g., in a series of steps. In other embodiments, instruction workflow(s) 145 may include tasks which may be executed partially or entirely in parallel. Yet in other embodiments, instruction workflow(s) 145 may provide a combination of series and parallel steps. In some embodiments, irrespective of the order, should any one step fail, in some embodiments, the instruction may not be signed. In some embodiments, the system may be configured to restart the respective workflow from the beginning, while in other embodiments just the failed step may be reattempted, e.g., a set number of times, before the entire workflow has been deemed to have failed. In some embodiments, the system may be configured to provide an alert, e.g., to instruction application 121 and/or to a system supervisor, e.g., to provide notification of the failed instruction and/or to elicit remedial actions.

Figure 2:
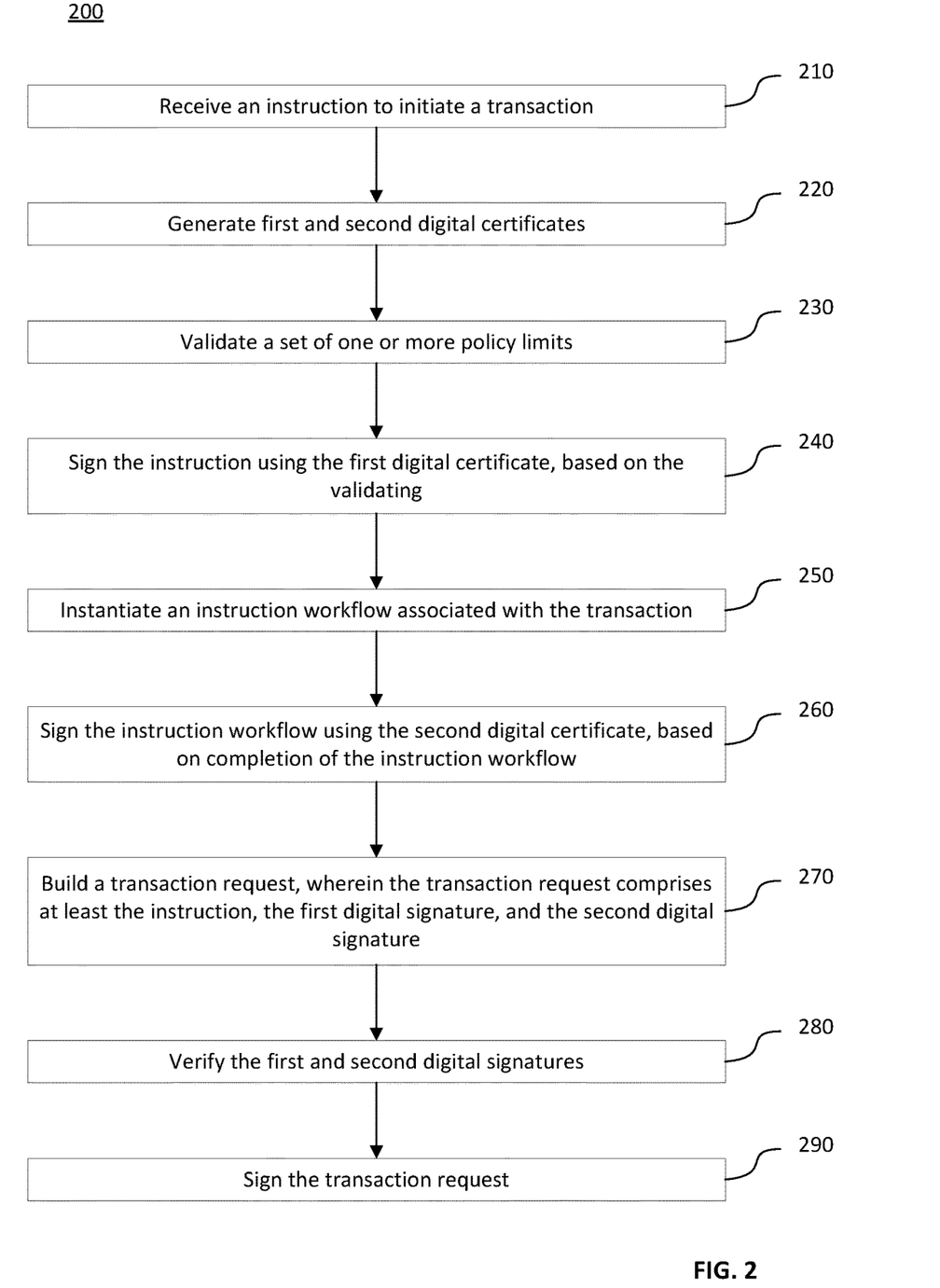
FIG. 2 depicts an example method for validating an instruction with multiple digital signatures, in accordance with at least one embodiment.

These and other features of instruction validating system 100 will be further understood with reference to the instruction validation method 200 of FIG. 2, herein.

FIG. 2 depicts an example method for validating an instruction with multiple digital signatures, in accordance with at least one embodiment. In various embodiments, method 200 may be implemented by system 100, executing code in one or more processors therein. For example, in some embodiments, method 200 may be performed on a computer (e.g., computer system 1000 of FIG. 3) having one or more processors (e.g., processor(s) 1010 of FIG. 3) and memory (e.g., system memory 1020 of FIG. 3), and one or more code sets, applications, programs, modules, and/or other software stored in the memory and executing in or executed by one or more of the processor(s).

Method 200 begins at step 210 when a processor (e.g., of a custody platform or digital assets platform that implements digital assets instruction processing or transaction processing of a request for a change to the blockchain) receives an instruction to initiate a transaction, e.g., via instruction validating system 100. For example, in some embodiments, a user may initiate a transaction request to execute a transaction and publish it to a blockchain (e.g., blockchain network 110). In some embodiments, an instruction may be received from an end user, e.g., a client of a bank or financial institution. In other embodiments, an instruction may be received from an account or fund manager or other agent that specifies instructions or transactions, e.g., for a customer or within a fund. In some embodiments, an instruction to implement a transaction request may include, for example, details such as the sender's address, recipient's address, transaction amount, and/or any optional data or metadata associated with the transaction.

At step 220, in some embodiments, multiple (e.g., first and second) digital certificates may be generated, e.g., by a signing service such as signing service 130. These certificates are created and may be distributed to various upstream systems for use in the construction of the signatures that will be required to execute the instruction, as explained herein. In some embodiments, a first digital certificate may be generated which may be used to apply a signature to the instruction at client instruction entry, e.g., when policy limits are verified, as explained herein. This confirms that the details of the transaction are not altered from the user's intentions as the instruction travels through the systems. In some embodiments, a second digital certificate may be generated which may be used to apply a signature to the instruction only once all the steps or tasks of an instruction workflow have been successfully completed, as described herein. These signatures offer a cryptographically secure way of communicating to the signing service that these processes have been completed and the transaction has not been altered since the policy checks were performed.

In some embodiments, the instruction details that make up the transaction request may be transformed into, e.g., a fixed-length string of characters called a hash value using a cryptographic hashing algorithm. A private key, which serves as unique digital identity, may be generated, e.g., by signing service 130, and may be utilized to sign the hash value, resulting in a digital signature that serves as cryptographic proof of the transaction's authenticity. This signature, along with a corresponding public key and relevant transaction information, may be used to validate the signatures prior to execution of the transaction, as explained herein. Accordingly, the first and second digital certificates may be used to verify the authenticity of the transaction before it is broadcast to the network. By employing this process, digital certificates enhance the security and trustworthiness of transactions, ensuring that only authorized parties can initiate and validate transactions on the network, and that the instruction workflow was completed.

At step 230, in some embodiments, a set of one or more policy limits may be validated. As explained herein, in some embodiments, upon receipt of an instruction to execute a transaction request, embodiments must first validate a set of policy limits. In various embodiments, these policy limits may be related to the user, the transaction, the recipient, and/or any other parties or institutions (e.g., a bank or other financial institution), or combinations thereof.

In some embodiments, a set of policy rules may require validation prior to executing a transaction for several reasons. First, these policies serve as safeguards to maintain the integrity and security of the network. By evaluating transactions against defined criteria such as transaction limits, regulatory compliance, and smart contract rules, policy rules ensure that only legitimate and authorized transactions are allowed, preventing malicious or erroneous activities. Moreover, policy validation helps enforce compliance with certain legal and regulatory requirements, reducing the risk of unlawful transactions and reinforcing the blockchain network's legitimacy and adoption in the broader financial ecosystem. Additionally, these rules may help prevent issues like double spending and unauthorized access, promoting trust and confidence among network participants. Accordingly, validating a set of policy rules before executing a transaction is important to the network's security, trustworthiness, and adherence to both internal and external regulations, ultimately ensuring its long-term sustainability and utility.

In some embodiments, example policy limits may relate transaction amount limits to prevent excessive transfers, compliance with certain regulations for regulatory adherence, the verification of whitelisted addresses to ensure transactions involve trusted counterparts, gas fec constraints to regulate transaction costs, checks for valid smart contract interactions, measures to prevent double spending by verifying available balances, time-based constraints to enforce transaction timing, multi-signature requirements for secure authorization, account-specific permissions to control access, and dispute resolution mechanisms for complex transactions, among others. In some embodiments, a predefined set of one or more policy limits may require validation, while in other embodiments, set of policy limits may be generated based on information provided in the instruction.

At step 240, in some embodiments, the instruction may be signed using the first digital certificate, based on the validating. In some embodiments, only when all policy limits associated with a transaction request have been validated will a first signature be applied. In some embodiments, if a given policy limit cannot be validated, an alert or other remedial action may be triggered. For example, in some embodiments, a failed policy check may be rerun a defined number of times, e.g., once or twice, or may apply alternative or equivalent policy rules which may replace a failed check. If the set of one or more policy limits is validated, then a first signature may be applied, e.g., using the first certificate. As described herein, ultimately this signature will be verified by the signing service prior to execution of the transaction.

At step 250, in some embodiments, an instruction workflow associated with the transaction may be instantiated.

In some embodiments, an instruction workflow may be or may include an ordered set of checks, steps, or tasks which must be completed before a signing service will sign an instruction. For example, an instruction workflow may include checks for sanctions limitations, quantity limits, balance checks, etc. Such checks make up a given workflow required to gain approval to issue a blockchain transaction. It should be noted that some workflows may include validation of one or more policies, or that a policy check was completed. As described herein, an instruction workflow may implement one or more external services to verify criteria associated with the transaction request. For example, before the instruction can be signed, various upstream services may each execute separate functions, e.g., sanction screening, source of funds confirmation, travel rule checks, etc.

In some embodiments, instruction workflows may be required to be completed in a certain order, e.g., in a defined series of steps. In other embodiments, instruction workflows may include tasks which may be executed partially or entirely in parallel. Yet in other embodiments, instruction workflows may include various combinations of series and/or parallel steps. In some embodiments, irrespective of the order, should any one step fail, the instruction may not be signed. In some embodiments, the system may be configured to restart the respective workflow from the beginning, while in other embodiments just the failed step may be reattempted, e.g., a set number of times, before the entire workflow has been deemed to have failed. In some embodiments, the system may be configured to provide an alert, e.g., to the initiator of the transaction request (a client, user, and/or a system supervisor), e.g., to provide notification of the failed instruction and/or to elicit remedial actions. In some embodiments, if the instruction workflow is unable to be completed, the instruction will not be signed and the transaction request will be denied.

At step 260, in some embodiments, instruction workflow may be signed, e.g., using the second digital certificate, based on completion of the instruction workflow. For example, in some embodiments, once the instruction workflow is confirmed to have been completed, an indication may be sent to the signing service to apply a second signature to the instruction using the second digital certificate. This second signature may ultimately be used as confirmation that the instruction workflow was completed.

In some embodiments, the second signature may be applied to the same instruction that was previously signed upon validation of the policy limits. This process is often referred to as "multi-signature" or "multi-sig" for short. Multi-signature transactions require multiple private keys to authorize and execute a transaction, adding an extra layer of security and control.

In a multi-signature setup, the transaction is not considered valid until a defined number of signatures are applied. Of course, in some embodiments, additional signatures may be required, e.g., from additional parties, entities, applications, functions, and/or processes. For example, a 2-of-3 multi-signature scheme would require signatures from any two out of three authorized parties to approve the transaction. This can be useful in scenarios where enhanced security, trust, or governance is required, such as joint accounts, business partnerships, or escrow services. Each additional signature increases the complexity and security of the transaction, but it also adds a layer of coordination and complexity to the signing process. Likewise, in some embodiments, other processes (besides for policy limit checks and instruction workflow completion checks) may be required to be completed and signed prior to execution of the transaction. In such scenarios, additional certificates may be generated and used to sign the instruction with additional digital signatures, all of which may be required before the transaction may be executed.

At step 270, once the policy limits and instruction workflow have each been signed, a complete transaction request may be built. In some embodiments, the instruction, the first digital signature, and the second digital signature may all be aggregated, e.g., in the digital asset management platform or any other wallet infrastructure, a transaction request may be generated and prepared for signing by the signing service, as described herein.

In some embodiments, the first digital signature (of the policy limits) and the second digital signature (of the instruction workflow), may be intricately combined with the original transaction instruction. This may create a cohesive transaction request that firmly binds the digital signatures to the transaction data, ensuring that any tampering or alteration is readily detectable. To achieve this, in some embodiments, the binary representation of each digital signature may be appended to the binary representation of the transaction instruction. This concatenation forms a single, contiguous string of binary data that incorporates both the transaction's specifics and the multiple cryptographic signatures. Subsequently, in some embodiments, this combined binary data may be serialized into a standardized format, e.g., utilizing a defined encoding scheme. This serialization ensures that the data can be effortlessly transmitted and processed by network participants. The outcome is the creation of the transaction request, a self-contained entity containing both the transaction's particulars and the various cryptographic proofs. Should anyone attempt to modify either the transaction instruction or either of the digital signatures, the resulting mismatch between the data and the signature during verification would expose tampering or unauthorized access.

At step 280, in some embodiments, the signing service may be configured to verify that the first and second digital signatures have been included in the transaction request. The signing service may verify that a transaction request has been signed by both signatures by employing a cryptographic process designed to validate the authenticity of the digital signatures. In some embodiments, the signing service may include an application protocol interface (API) call to an external validation engine. In some embodiments, the signing service may have been previously provided with, or may be otherwise configured to retrieve, the respective public key that was generated, as part of a private/public key pair, with each private key used for the two digital signatures. These public keys may then be used for signature verification. In some embodiments, the signing service may disassemble the transaction request, breaking it down into its fundamental components, which encompass the transaction data (the instruction) and the two attached digital signatures. The signing service may then employ the same cryptographic hashing algorithm utilized to hash the transaction data from the request, producing a hash value that should match the one originally computed.

Next, in some embodiments, the signing service may use the two public keys to decrypt each of the digital signatures, one public key per digital signature, resulting in a signature hash value for each. The signing service may then compare these values to the hashes computed from the transaction data. For each signature, if the two hash values correspond, the service confirms the validity of the signature, signifying that it aligns with the transaction data. Further checks, such as verifying the public key's association with an authorized user or account, may also be performed. Upon successfully verifying the digital signatures, the signing service may then authenticate the transaction request as genuine and properly signed for both policy limit validation and instruction workflow completion purposes. In some embodiments, if the signing service is unable to verify that all required signatures have been signed to the instruction, an alert or other remedial action may be implemented, or the transaction may be rejected.

At step 290, if the signing service was able to verify that all required signatures (e.g., verifying policy limit validation and instruction workflow completion) have been signed to the instruction, then the signing service may sign the transaction request. Once signed, the transaction request may be broadcast, e.g., to the blockchain network, or execute subsequent steps in the transaction processing, depending on the specific use case. Ultimately, the signed transaction request may be written to a blockchain ledger.

Figure 3:
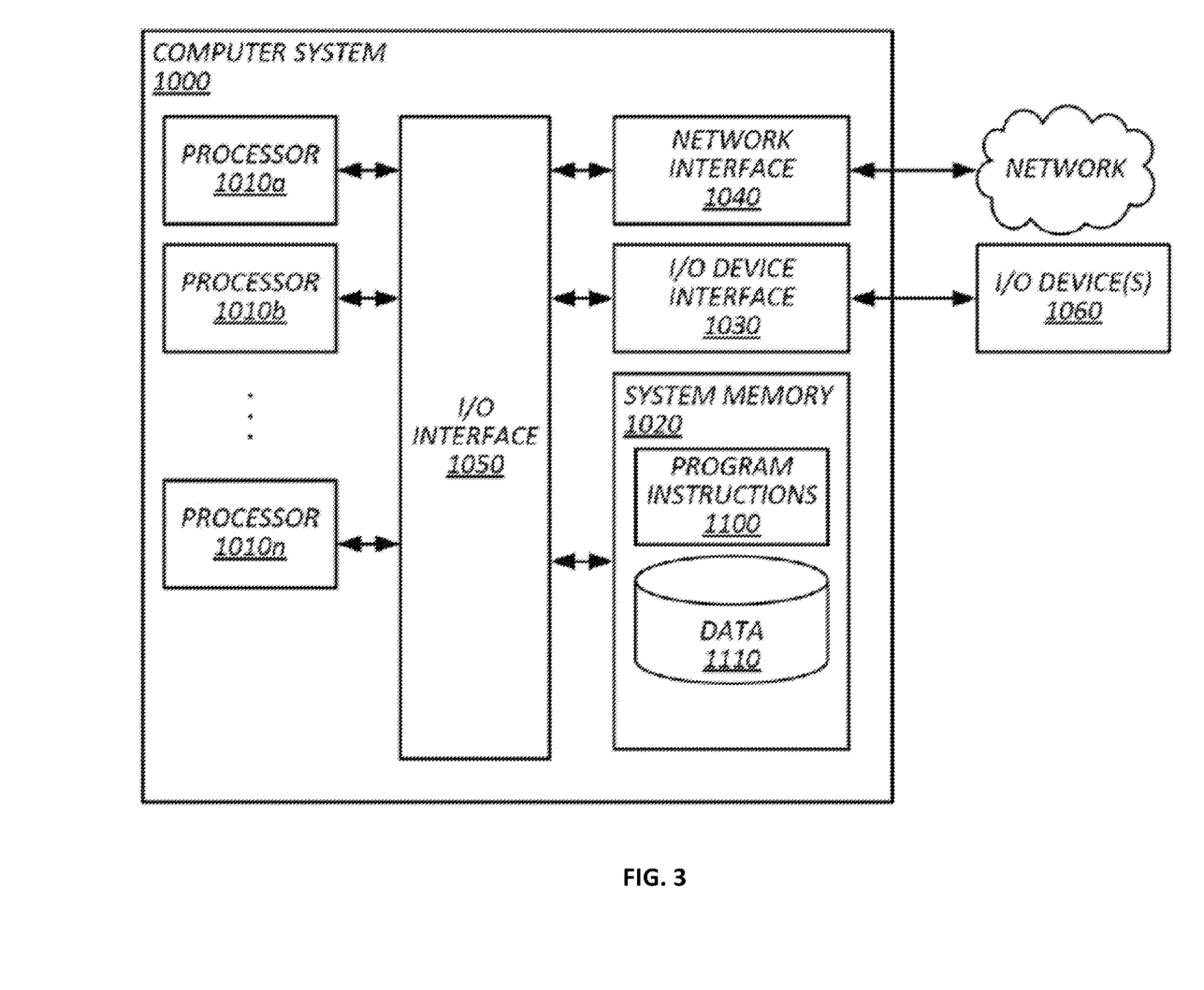
FIG. 3 depicts an example computer system on which systems and methods described herein may be executed, in accordance with at least one embodiment.

Some embodiments may execute the above operations on a computer system, such as the computer system of FIG. 3, which is a diagram that illustrates a computing system 1000 in accordance with embodiments of the present techniques. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, external (e.g., third party) content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

This written description uses examples to disclose the implementations, including the best mode, and to enable any person skilled in the art to practice the implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for validating an instruction with multiple digital signatures, implemented by one or more processors, the method comprising:
   receiving an instruction to initiate a transaction;
   generating first and second digital certificates;
   validating a set of one or more policy limits;
   signing the instruction using the first digital certificate, thereby generating a first digital signature, based on the validating;
   instantiating an instruction workflow associated with the transaction;
   signing the instruction workflow using the second digital certificate, thereby generating a second digital signature, based on completion of the instruction workflow;
   building a transaction request, wherein the transaction request comprises at least the instruction, the first digital signature, and the second digital signature;
   verifying the first and second digital signatures; and
   signing, by a signing server, the transaction request.

2. The method of claim 1, wherein the set of one or more policy limits is used to authorize the transaction.

3. The method of claim 1, wherein the instruction workflow comprises a plurality of upstream systems, each of which is configured to perform respective policy checks.

4. The method of claim 3, wherein policy checks comprise one or more of sanction screening, source of funds checks, or travel rules.

5. The method of claim 3, wherein the upstream systems are executed in a specific order and wherein failure of one policy check terminates the instruction flow.

6. The method of claim 1, wherein the instruction workflow implements one or more external services to verify criteria associated with the transaction request.

7. The method of claim 1, further comprising writing the signed transaction request to a blockchain ledger.

8. The method of claim 1, wherein verifying the first and second digital signatures comprises executing a signing service that is configured to enforce the validity of the first and second digital signatures.

9. The method of claim 8, wherein the signing service comprises an application protocol interface (API) call to an external validation engine.

10. A system for validating an instruction with multiple digital signatures, implemented by one or more processors, the system comprising:
    one or more code sets stored in memory and executed by the one or more processors, which, when executed, configure the one or more processors to:
    receive an instruction to initiate a transaction;
    generate first and second digital certificates;
    validate a set of one or more policy limits;
    sign the instruction using the first digital certificate, thereby generating a first digital signature, based on the validating;
    instantiate an instruction workflow associated with the transaction;
    sign the instruction workflow using the second digital certificate, thereby generating a second digital signature, based on completion of the instruction workflow;
    build a transaction request, wherein the transaction request comprises at least the instruction, the first digital signature, and the second digital signature;
    verify the first and second digital signatures; and
    sign, by a signing server, the transaction request.

11. The system of claim 10, wherein the set of one or more policy limits is used to authorize the transaction.

12. The system of claim 10, wherein the instruction workflow comprises a plurality of upstream systems, each of which is configured to perform respective policy checks.

13. The system of claim 12, wherein policy checks comprise one or more of sanction screening, source of funds checks, or travel rules.

14. The system of claim 12, wherein the upstream systems are executed in a specific order and wherein failure of one policy check terminates the instruction flow.

15. The system of claim 10, wherein the instruction workflow implements one or more external services to verify criteria associated with the transaction request.

16. The system of claim 10, further configured to write the signed transaction request to a blockchain ledger.

17. The system of claim 10, wherein verifying the first and second digital signatures comprises executing a signing service that is configured to enforce the validity of the first and second digital signatures.

18. The system of claim 17, wherein the signing service comprises an application protocol interface (API) call to an external validation engine.

19. A method for validating an instruction with multiple digital signatures, implemented by one or more processors, the method comprising:
- receiving an instruction to initiate a transaction;
- validating a set of one or more policy limits;
- signing the instruction using a first digital certificate, thereby generating a first digital signature, based on the validating;
- instantiating an instruction workflow associated with the transaction;
- signing the instruction workflow using a second digital certificate, thereby generating a second digital signature, based on completion of the instruction workflow;
- building a transaction request, wherein the transaction request comprises at least the instruction, the first digital signature, and the second digital signature;
- verifying the first and second signatures; and
- signing, by a signing server, the transaction request.

20. The system of claim 10, wherein the set of one or more policy limits is used to authorize the transaction; and
- wherein the instruction workflow comprises a plurality of upstream systems, each of which is configured to perform respective policy checks.

* * * * *